United States Patent
Schaefer et al.

(10) Patent No.: US 11,704,823 B2
(45) Date of Patent: Jul. 18, 2023

(54) SYNTHETIC APERTURE RADAR DATA REDUCTION FOR SATELLITES

(71) Applicant: Airbus Defence and Space GmbH, Taufkirchen (DE)

(72) Inventors: Christoph Schaefer, Taufkirchen (DE); Jörg Hippler, Taufkirchen (DE); Andrea Federico Loinger, Taufkirchen (DE); Christoph Heer, Taufkirchen (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 232 days.

(21) Appl. No.: 17/323,766

(22) Filed: May 18, 2021

(65) Prior Publication Data

US 2021/0366140 A1 Nov. 25, 2021

(30) Foreign Application Priority Data

May 20, 2020 (EP) .................................... 20175733

(51) Int. Cl.
*G06K 9/00* (2022.01)
*G06T 7/571* (2017.01)
(Continued)

(52) U.S. Cl.
CPC .......... *G06T 7/571* (2017.01); *G01S 13/9011* (2013.01); *G06T 9/00* (2013.01);
(Continued)

(58) Field of Classification Search
None
See application file for complete search history.

(56) References Cited

U.S. PATENT DOCUMENTS 6,943,724 B1 * 9/2005 Brace .................. G01S 13/9029
342/25 R
10,241,202 B2 3/2019 Becker
(Continued)

FOREIGN PATENT DOCUMENTS

EP 3021135 B1 5/2016

OTHER PUBLICATIONS

Attema, Evert, et al. "Flexible dynamic block adaptive quantization for Sentinel-1 SAR missions." IEEE Geoscience and Remote Sensing Letters 7.4 (2010): 766-770. (Year: 2010).*
(Continued)

*Primary Examiner* — Avinash Yentrapati
(74) *Attorney, Agent, or Firm* — Greer, Burns & Crain, Ltd.

(57) ABSTRACT

A preprocessing technique for synthetic radar images. An embodiment of a method for preprocessing synthetic aperture radar images includes: receiving range-compressed radar data generated from raw radar image data on-board a satellite or an airborne vehicle; generating a preliminary SAR image by performing a pre-focusing on the range-compressed radar data; extracting image subsectors from the preliminary SAR image; transmitting the extracted image subsectors to an on-ground portion; reconstructing the range-compressed radar data pertaining to the extracted image subsectors; and making the range-compressed radar data pertaining to the extracted image subsectors available for a Nominal synthetic aperture radar processor, wherein the Nominal synthetic aperture radar processor is configured to generate a focused SAR image having a nominal value of image resolution that is higher than the resolution of the preliminary SAR image.

13 Claims, 13 Drawing Sheets

(51) Int. Cl.
*G01S 13/90* (2006.01)
*G06T 9/00* (2006.01)

(52) U.S. Cl.
CPC .............. *G06T 2207/10028* (2013.01); *G06T 2207/10044* (2013.01); *G06T 2207/20056* (2013.01)

(56) References Cited

U.S. PATENT DOCUMENTS

| | | | | |
|---|---|---|---|---|
| 2014/0009326 A1* | 1/2014 | Wishart | ............. | G01S 13/90 342/25 D |
| 2015/0061926 A1* | 3/2015 | Ranney | ............. | G01S 7/414 342/25 B |
| 2016/0139261 A1* | 5/2016 | Becker | ............. | G01S 13/904 342/25 F |
| 2020/0166635 A1* | 5/2020 | Furuta | ............. | G01S 13/9094 |

OTHER PUBLICATIONS

European Search Report; priority document.

* cited by examiner

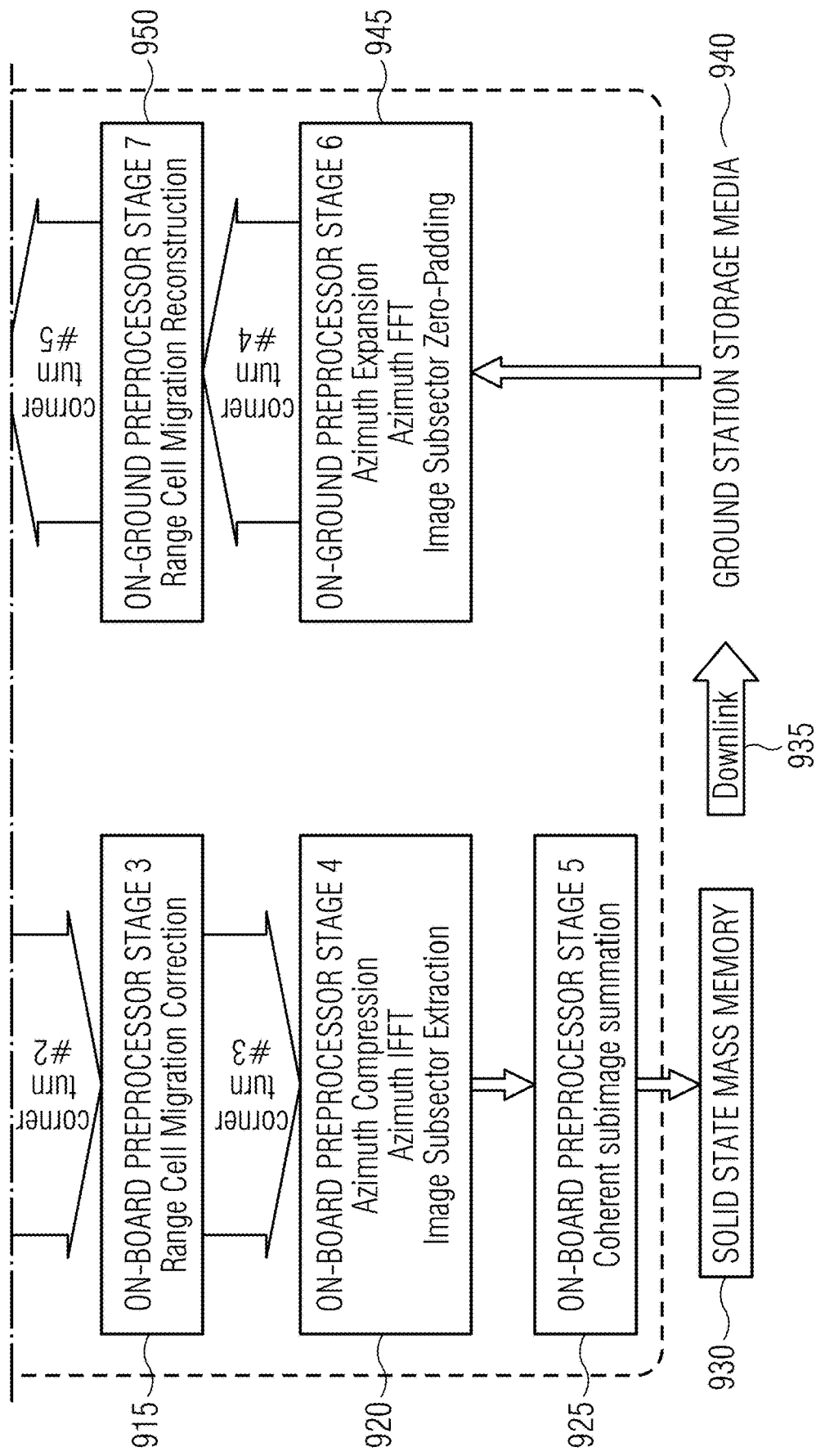

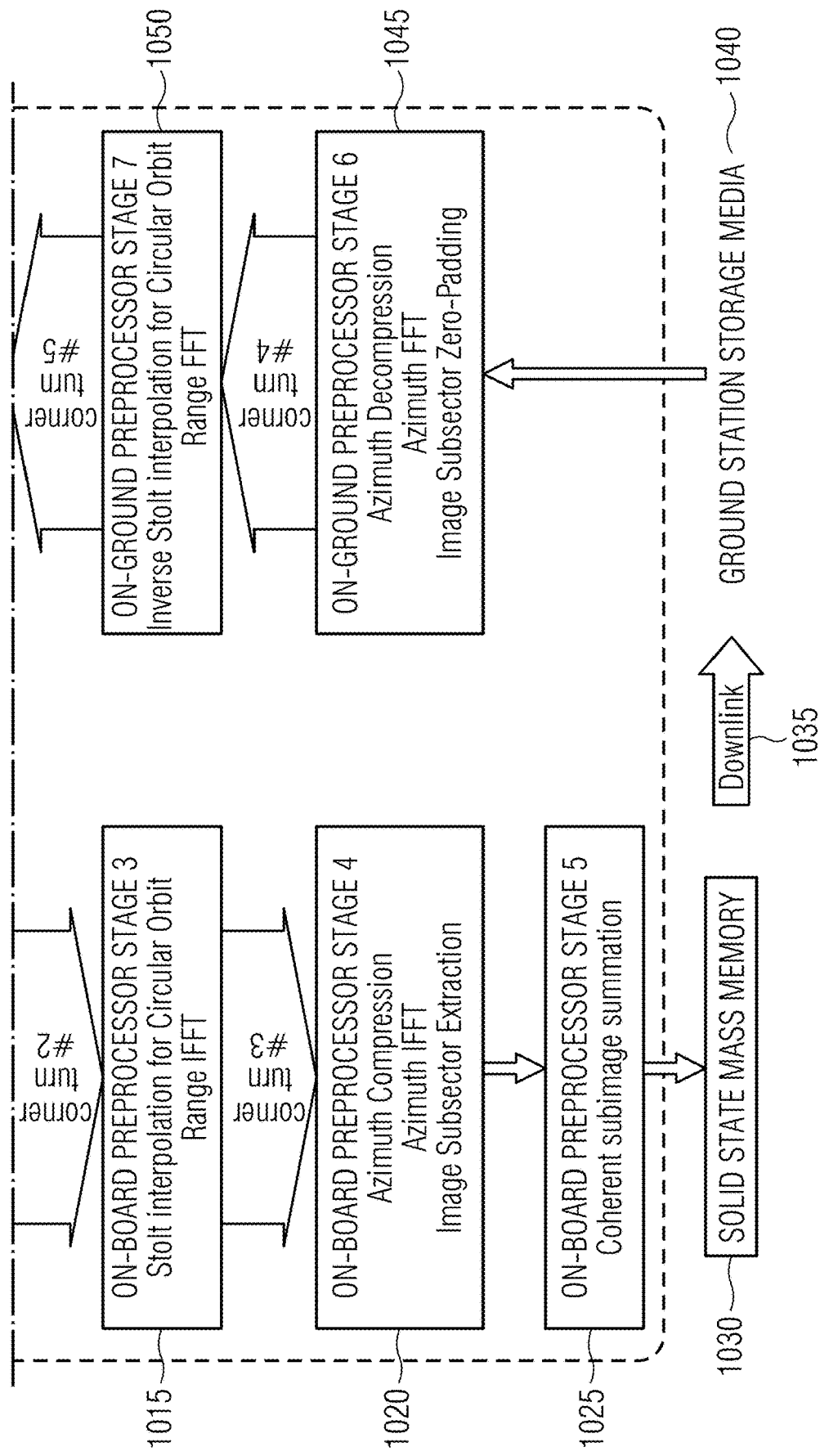

SYNTHETIC APERTURE RADAR DATA REDUCTION FOR SATELLITES

CROSS-REFERENCES TO RELATED APPLICATIONS

This application claims the benefit of the European patent application No. 20175733.3 filed on May 20, 2020, the entire disclosures of which are incorporated herein by way of reference.

FIELD OF THE INVENTION

The present invention generally relates to the field of synthetic aperture radar images and, in particular, to a method of preprocessing these signals and a corresponding apparatus for preprocessing these signals.

BACKGROUND OF THE INVENTION

1. Discussion of the State of the Art

Modern earth observation satellites such as TerraSAR-X, Sentinel-1, PAZ, Kompsat6, Radarsat2, and others, carry synthetic aperture radar (SAR) instruments which generate radar images. Raw data is generated on-board, the data is then downlinked to ground stations and the downlinked data is processed on ground to generate complex-valued radar images.

As today's images have very high resolution, the underlying raw data volumes generated by the instruments are extremely large. Looking down from low earth orbits, ground stations are only visible for several minutes as the satellite flies over these stations, and only a limited number of image raw data sets can be linked down to the ground.

This bottleneck has been present for many years, and it consistently limits the targeted output of many missions. Solutions are urgently sought.

There exist two principal solutions: either the data rates of the transmission channels are increased via a direct downlink or via indirect one such as a data relay satellite such as ESA's EDRS; or a data reduction procedure is implemented on-board, with the purpose of decreasing the data volumes required to process the final image on the ground.

The present invention addresses the second approach of decreasing the data volumes. In the future, even in the presence of solutions relating to increasing the data rates of transmission, an efficient data reduction method will remain the preferred choice of many missions which cannot rely on the infrastructure provided by the former solutions for reasons of security and privacy, or of cost and convenience.

The application of a so-called "Smartfilter" (e.g., EP 3 021 135 B1) provides lossless data reduction. The filter reduces bandwidth at the beginning and ends of each rangeline, allowing a reduction of signal sampling rate and thus data rate. The eliminated frequency bands are data associated with targets external to the scene imaged by the SAR sensor. However, the processing resources required on-board are demanding and a potential future increase in processing power available on board will not enable an improved data reduction factor by this approach. Another disadvantage of the Smartfilter is the dependency of the data reduction factor on the parameters of the data take. It is, for example, most efficient when the radar pulse length is large in relation to the swath width.

The method of Block Adaptive Quantization (BAQ) or synonymously Block Floating Point Quantization (BFPQ) has been known for several decades. It has been implemented, for instance, on the TerraSAR-X satellite. A more recent advancement of this method is called Flexible Dynamic Block Adaptive Quantization (FDBAQ) and has been implemented on ESA's Sentinel-1 satellite. Both methods are based on adaptive quantization of radar raw data. This compression algorithm is applied to the raw data without further processing needs, and it can be parametrized for low compression loss (Signal-to-Compression-Noise-Power-Ratio e.g. SCNR>20 dB). Implementation is on FPGA and low processing power is required on-board. The major disadvantage is a low compression factor on the order of 2-3. This low compression rate cannot be increased by providing additional processing power on-board. A further disadvantage is some residual compression noise which can deteriorate image quality in dark regions with isolated strong targets. Further information about BAQ can be found in J. Curlander, R. McDonough, "Synthetic Aperture Radar", 1991, ISBN 0-471-85770-X and further information about the FDBAQ can be found in E. Attema et al., "Flexible Dynamic Block Adaptive Quantization for Sentinel-1 SAR Missions," in IEEE Geoscience and Remote Sensing Letters, vol. 7, no. 4, pp. 766-770, October 2010.

2. Technical Problem to be Solved

A technical problem solved by the present invention is the reduction of the data volumes which need to be transmitted to the ground per ordered SAR image, preferably by a significant factor, such as 10 or more.

A truly lossless data reduction of the raw data of a full image is not feasible at all as the information content of the processed, final, complex-valued SAR image is not significantly smaller than that of the underlying raw data set. This is mainly due to the random behavior of the phase of the image signal.

On the other hand, many images do comprise information, which, from a user's viewpoint, is useless. An example is ship detection in satellite-based, maritime radar images. Only the relatively small image sectors containing ships are in demand, while the rest of the image is wasted information. The same is true for many terrestrial images, where vast areas of desert or forest in many instances are of no interest. A simple data reduction approach could be applied if the image sectors in demand could be extracted on-board, and only these data sets were transmitted to the ground in a lossless procedure. However, this approach fails due to the lack of on-board processing power with which to transform the raw data of the instrument into focused SAR images. An extraction of that raw data set which is required to process a particular small subsector of the image, without any focusing, is not an efficient procedure. A moderate reduction of raw data without focusing is possible in the range direction of the data, but the efficiency of this measure is limited by the range walk of the signal. No reduction whatsoever is possible in the azimuth direction for staring spotlight modes, where each point target in the scene requires information from every range-line in the data take.

The present invention is based on the implementation of a SAR preprocessor which performs an early bulk focusing task with an image resolution which may be a factor 10 or 100 worse than what is nominally required. This SAR preprocessor may significantly reduce computing power and hardware resources compared to a Nominal SAR processor, and thus can be implemented for satellite on-board use in the future as processing technology matures. The comparably low resolution of the on-board images may suffice to extract the desired image subsectors from the full image. Only these desired subsectors may then be transmitted in small data volumes while the remainder of the image is discarded.

The preprocessor according to the invention may apply fully reversible algorithms, with the exception of this final discarding of irrelevant parts of the image. This is so because like in the Nominal SAR Processor, the phase of the signal may always be maintained. Since no information from within the subsectors may be lost, on-ground the received data volumes can be processed to give full resolution.

SUMMARY OF THE INVENTION

The invention is set out in the independent claims. Specific embodiments of the invention are outlined in the dependent claims.

According to a first aspect, a method for preprocessing synthetic aperture radar images is described. The method comprises receiving range-compressed radar data generated from raw radar image data on-board a satellite or any type of airborne vehicle. The method may comprise a pre-focusing step. The method comprises generating a preliminary synthetic aperture radar (SAR) image from the range-compressed radar data. In other words, the method comprises a step of generating a preliminary SAR image by performing a pre-focusing on the range-compressed radar data. This may result in a preliminary SAR image at an image resolution which is lower than the resolution generated by a Nominal SAR processor but is sufficient to identify any image subsectors of interest in the SAR image. The method further comprises extracting image subsectors from the preliminary SAR image, e.g., from the data outputted by the pre-focusing step. The method further comprises transmitting the extracted image subsectors to an on-ground portion, e.g., a satellite ground station. There, the range-compressed radar data pertaining to the extracted image subsectors can be reconstructed and made available to a Nominal synthetic aperture radar processor able to generate a final SAR image at a nominal image resolution that may be, e.g., considerably higher than pre-focused SAR image generated on-board. In this context, the method comprises the step of reconstructing the range-compressed radar data pertaining to the extracted image subsectors. Further, the method comprises making the range-compressed radar data pertaining to the extracted image subsectors available for a Nominal synthetic aperture radar processor, wherein the Nominal synthetic aperture radar processor is configured to generate a focused SAR image having a nominal value of image resolution that is higher than the resolution of the preliminary SAR image.

The method according to the first aspect may alternatively be described as follows in this paragraph. The method may comprise receiving range-compressed radar data. The method may comprise performing a pre-focusing on the range-compressed radar data. Performing the pre-focusing results in a preliminary synthetic aperture radar (SAR) image at a reduced resolution compared to a nominal value. The method comprises extracting image subsectors from the preliminary SAR image. The method comprises transmitting the extracted image subsectors. The extracted image subsectors may be transmitted to an on-ground portion, e.g., a satellite ground station. The method comprises receiving the image subsectors. The method comprises reconstructing the range-compressed radar data pertaining to the extracted image subsectors. The method comprises feeding the output data to a Nominal synthetic aperture radar processor.

The pre-focusing step resembles known SAR focusing processing algorithms, but is simplified to retain only the basic algorithmic steps. Such algorithms as such, and their efficient implementation, will be known to the person skilled in the art.

Extracting image subsectors from the data outputted by the pre-focusing step may allow only the subsectors with relevant data to be sent to ground. This may lead to considerable reduction of downlink volume and bandwidth requirements compared to known SAR satellite systems. On the other hand, as the raw data may be reconstructed on-ground, no information from within the extracted subsectors may be lost and therefore, full resolution can be achieved by the Nominal synthetic aperture radar processor that uses the output data of the preprocessing method according to the invention as input data.

In some examples, a first Fast Fourier Transform is performed on the data received from the range compression, a first correction is performed on the data outputted by the first Fast Fourier Transform and a first Inverse Fast Fourier Transform is performed on the data received from the first correction.

This may allow for the data to be preprocessed in a format that allows for lower hardware requirements in the device that may use this method. It may also allow for a reduced power usage in the device.

In some further examples, the first Fast Fourier Transform and/or the first Inverse Fast Fourier Transform is an azimuth Transform.

Performing a first azimuth Fast Fourier Transform (FFT) on the received data may allow the data to be converted into the frequency domain. The data may then be worked on in further steps of the method. An advantage of this frequency domain data may be that it allows for more efficient bulk focusing of the received data. In turn, this may lead to a far simpler architecture of the device that uses this method. The device may require less power to run and may have simpler on-board interfaces than currently known SAR processors.

Performing a first correction on the data outputted by the first azimuth FFT may allow for more accurate data retrieval. As a result, this may lead to fewer losses in the method.

Performing a first azimuth Inverse Fast Fourier Transform on the data received from the first correction may allow for the data to be transmitted in the same format it was received in. This may allow the method to achieve the required pre-focusing.

In some examples, this portion of the method takes place on-board a satellite. This may allow for a reduced power usage on the satellite and reduced on-board preprocessor requirements when compared to known SAR processors and preprocessors.

In some examples, after the data is transmitted, image subsector zero-padding is performed on the received data from the image subsector extraction and the data is subjected to an inverse synthetic aperture radar preprocessing in order to reverse the process steps of the pre-focusing step. Thereby, the raw data existing before the pre-focusing step was applied, may be reconstructed. The data may comprise the selected image subsectors.

Subjecting the data related to the selected image subsectors, to an inverse synthetic aperture radar preprocessing and thereby reconstructing the original raw data may allow for known SAR processors to now process the preprocessed data. This in turn may mean that the disclosed method is compatible with known SAR processors and that the known processors may not need to be altered in order to incorporate the disclosed method.

In some examples, this portion of the method is performed in an on-ground portion. This may allow for a reduced power usage in the satellite portion as the entire method may not be performed on-board. It may also allow for lower hardware requirements on-board the satellite.

In some examples, after the image subsector zero-padding is performed, a second Fast Fourier Transform is performed on the data received from the image subsector zero-padding, a second correction is performed on the data outputted by the second Fast Fourier Transform, and a second Inverse Fast Fourier Transform is performed on the data received from the second correction.

This may allow for the data to be preprocessed in a format that allows reconstruction of the data in raw format.

In some further examples, the second Fast Fourier Transform and/or the second Inverse Fast Fourier Transform is an azimuth Transform.

Performing a second azimuth Fast Fourier Transform on the data received from the image subsector zero-padding may allow the data to be converted once again into the frequency domain. This may allow data to be more efficiently bulk focused leading to the device using the method to use less power and have simpler interfaces.

Performing a second correction on the data outputted by the second azimuth Fast Fourier Transform may allow for the preprocessed data to reconstruct the original uncorrected format. This secondary correction may additionally allow for the data to be modulated into a form that can be used for further method steps and/or a form that can be used in a Nominal SAR processor.

Performing a second azimuth Inverse Fast Fourier Transform on the data received from the second correction may allow for the data to be transmitted in the same format it was received in. This may allow the method to be compatible with known on-ground SAR processors as the known processors may still receive data in the same format as they would normally.

In some examples, the preprocessor uses a Range-Doppler SAR focusing algorithm or an Omega-K focusing algorithm for the pre-focusing step. These focusing algorithms may allow for the method to be more accurate as they may allow for the corrections, the subsector extraction and the zero-padding to be more accurate and more efficient. This may lead to fewer losses within the method. If the algorithms are sufficiently accurate, it may lead to the method being quasi-lossless leading to a far more efficient method than known processing methods. Additionally, the Omega-K focusing algorithm accounts for circular orbits which may lead to a more accurate method as it improves the bulk focusing quality of raw data acquired from spaceborne low-earth-orbits (LEO).

Alternatively, the method may use any focusing algorithm that may improve the above identified advantages of the disclosed method.

In some examples, after performing the first azimuth Inverse Fast Fourier Transform, the data is coherently summed. If the preprocessing occurs in a sub-band of frequencies, the coherent summing may allow for reduced volumes of downlink data in the steps of the method that may occur after this step as the method may not have to downlink each sub-band data volume individually.

In some examples, the transmitted data is downlinked to an on-ground portion. This may allow for the power used and prepossessing requirements of a device which may use this method on-board, for example, a satellite to be reduced when compared to known SAR processors.

In some examples, the processing of the synthetic aperture radar images occurs in the frequency domain. This may allow for a far greater bulk focusing efficiency resulting in less power used within the method and fewer prepossessing requirements of a device which may use this method.

In some examples, the outputted data is in the same format as the received data. This may allow the method to be compatible with known SAR processors and that the known processors may not need to be modified in order to incorporate the disclosed method.

According to a second aspect, an apparatus for preprocessing synthetic aperture radar images is described. The apparatus comprises a first performing component. The first performing component is configured to receive range-compressed radar data. The first performing component is configured to perform a pre-focusing on the range-compressed radar data. The pre-focusing results in a preliminary synthetic aperture radar (SAR) image at a reduced resolution compared to a nominal value.

The apparatus comprises an image extraction component. The image extraction component is configured to extract image subsectors from the preliminary SAR image outputted by the first performing component. The apparatus comprises an output. The output is configured to transmit the extracted image subsectors. The apparatus comprises a second performing component. The second performing component is configured to receive the image subsectors transmitted by the output. The second performing component is configured to reconstruct the range-compressed radar data pertaining to the extracted image subsectors. The second performing component is configured to feed the output data to a Nominal synthetic aperture radar processor.

The apparatus according to the second aspect may alternatively be described as follows in this paragraph. The apparatus comprises a first performing component. The first performing component is configured to receive range-compressed radar data generated from raw radar image data on-board a satellite or an airborne vehicle. The first performing component is configured to generate a preliminary synthetic aperture radar (SAR) image by performing a pre-focusing on the range-compressed radar data. The apparatus comprises an image extraction component. The image extraction component is configured to extract image subsectors from the preliminary SAR image. The apparatus comprises an output. The output is configured to transmit the extracted image subsectors to an on-ground portion. The apparatus comprises a second performing component. The second performing component is configured to reconstruct the range-compressed radar data pertaining to the extracted image subsectors. The second performing component is configured to make the range-compressed radar data pertaining to the extracted image subsectors available for a Nominal synthetic aperture radar processor. The Nominal synthetic aperture radar processor is configured to generate a focused SAR image having a nominal value of image resolution that is higher than the resolution of the preliminary SAR image.

The first performing component features a stage architecture wherein each stage may use:

an input memory for receiving the data to be processed, such as the range-compressed raw data in the first processing stage or the output data of a previous stage; and/or a signal processor with software programmability configured to read the data from the input memory; and/or an output memory configured to receive the data from the signal processor; and/or a Fast Fourier Transform coprocessor configured to read the data in the output memory, configured to perform a Fast Fourier Transform or an Inverse Fast Fourier Transform on the data and configured to store the modified data after the Fast Fourier Transform or an Inverse Fast Fourier Transform has been performed. The apparatus may further comprise a standard complex-instruction-set computer (CISC) configured for central control the apparatus and its elements.

The input memory for receiving raw image data may allow for the SAR image data to be stored within the apparatus before the apparatus begins preprocessing the data.

The processor with software programmability configured to process the received data and/or extract image subsectors received from the input memory may allow for the data to be preprocessed according the demands of the apparatus. If the processor is programmed to process the received data, it may mean that the processor is able to more efficiently preprocess that data when compared to known SAR processors and may also use less power than known processors. This may also allow for the architecture to be optimized for fast on-board processing. When the processor extracts image subsectors, it may allow only the subsectors with relevant data to be transmitted to the ground-based second performing component of the apparatus, performing an inverse synthetic aperture radar preprocessing thereby reconstructing the radar raw data related to the extracted image subsectors. This, in turn, may result in a more efficient preprocessing as the amount of data to be preprocessed is significantly reduced when compared to known processors. This may lead to an apparatus which requires less power than is used in known processors.

The Fast Fourier Transform coprocessor configured to read the data in the output memory, configured to perform an azimuth Fast Fourier Transform and/or an azimuth Inverse Fast Fourier Transform on the data and configured to store the modified data may allow the apparatus to efficiently perform bulk focusing. The FFT may allow the data to be modified into the frequency domain which may allow the bulk focusing process to be done more efficiently than in known processors. The IFFT may allow the data to be converted into a format that is compatible with known SAR processors so that the known processors may not need to be altered in order to accommodate for the disclosed apparatus. The storing of the data may allow the data to be stored before it is transmitted to, for example, a known Nominal SAR processor.

The output configured to transmit the selected image subsectors to a ground-based inverse synthetic aperture radar preprocessor of the second performing component may allow for the preprocessed data to be made available to a known Nominal SAR processor in a format that is compatible with such known SAR processor. This may mean that the apparatus is compatible with known Nominal SAR processors without the need for the known processors to be modified.

The standard complex-instruction-set computer (CISC) configured to control the preprocessor may allow the apparatus to be more efficient. The CISC may allow for the apparatus to be controlled in such a way that increases efficiency and/or reduces the power usage of the apparatus and/or optimizes the rate of preprocessing.

The apparatus may comprise an SAR instrument configured to generate raw radar image data.

In some examples, the apparatus is configured to process the radar images in an azimuth direction or a range direction. Thus may allow for a more efficient process than in known SAR processors as the images are processed in only one direction.

In some examples, the Fast Fourier Transform coprocessor is configured to coherently sum the modified data and is configured to transfer the coherently summed data to the output. This may allow for, when the apparatus extracts data from a sub-band of frequencies, the reduction of power usage in the apparatus as the apparatus may not have to preprocess each sub-band frequency individually. Additionally, this may allow the data transmitted to a ground based second performing component or a known Nominal SAR processor to be reduced by up to a factor of 10 when compared to known processors.

In some examples, the apparatus is configured to utilize a Range-Doppler focusing algorithm or an Omega-K focusing algorithm. These focusing algorithms may allow for the apparatus to be more accurate as they may allow for corrections made to the preprocessed data and, for example, subsector extraction to be more accurate and more efficient. This may lead to fewer losses within the apparatus. If the algorithms are sufficiently accurate, it may lead to the apparatus being quasi-lossless leading to a far more efficient apparatus than known SAR processors. Additionally, the Omega-K focusing algorithm accounts for circular orbits which may lead to a more accurate data output.

Alternatively, the apparatus may use any focusing algorithm that may improve the above identified advantages of the disclosed apparatus.

In some examples, the apparatus comprises a digital signal processor or a field-programmable gate array, wherein the digital signal processor or a field-programmable gate array are configured to process the received data. These components may allow for greater customization of the preprocessing process. This may lead to greater efficiency and/or reduced power usage and/or more accurate outputted data and/or faster preprocessing. It may also allow the apparatus to use any algorithm that is suitable for the situation the apparatus is in.

In some examples, the apparatus is radiation hardened. This may lead to greater resilience of the apparatus should it be located in an area of higher than normal radiation and/or experiences radiation bursts that may affect hardware.

The apparatus may be designed in a modular manner, comprising an on-board portion and an on ground-portion. The on-board portion comprises the first performing component and the image extraction component configured to extract image subsectors from the pre-focused SAR-image and further the output configured to transmit the image subsectors of the pre-focused SAR-image to a second performing component. The on-ground portion comprises the second performing element for the inverse SAR preprocessing in order to reconstruct the original raw data.

In some examples, the apparatus with its on-board portion is on-board a satellite or an airborne vehicle, e.g., a piloted aircraft, an unmanned aerial vehicle (UAV) or a so called HAPS platform (High Altitude Pseudo Satellite). This may allow for the apparatus to be configured in such a way that is particularly suitable for preprocessing SAR images in space and then transmitting the preprocessed data to an on-ground inverse SAR preprocessor for reconstruction of the original raw data and subsequently to a known Nominal SAR processor for SAR image processing at high resolution.

It is clear to a person skilled in the art that the statements set forth herein may be implemented under use of hardware circuits, software means, or a combination thereof. The software means can be related to programmed microprocessors or a general computer, an ASIC (Application Specific Integrated Circuit) and/or DSPs (Digital Signal Processors). For example, the processing unit may be implemented at least partially as a computer, a logical circuit, an FPGA (Field Programmable Gate Array), a processor (for example, a microprocessor, microcontroller (µC) or an array processor)/a core/a CPU (Central Processing Unit), an FPU (Floating Point Unit), NPU (Numeric Processing Unit), an ALU (Arithmetic Logical Unit), a Coprocessor (further microprocessor for supporting a main processor (CPU)), a GPGPU (General Purpose Computation on Graphics Processing Unit), a multi-core processor (for parallel computing, such as simultaneously performing arithmetic operations on multiple main processor(s) and/or graphical processor(s)) or a DSP.

It is further clear to the person skilled in the art that even if the herein-described details will be described in terms of a method, these details may also be implemented or realized in a suitable device, a computer processor or a memory connected to a processor, wherein the memory can be provided with one or more programs that perform the method, when executed by the processor. Therefore, methods like swapping and paging can be deployed.

Even if some of the aspects described above have been described in reference to the apparatus, these aspects may also apply to the method and vice versa.

BRIEF DESCRIPTION OF THE DRAWINGS

These and other aspects of the invention will now be further described, by way of example only, with reference to the accompanying figures, wherein like reference numerals refer to like parts, and in which.

DETAILED DESCRIPTION OF THE PREFERRED EMBODIMENTS

The on-ground processor yielding the full image resolution is referred to in the current disclosure as the Nominal SAR Processor, while the simplified on-board processor which constitutes this invention, is referred to in the present disclosure as the SAR Preprocessor.

Figure 1:
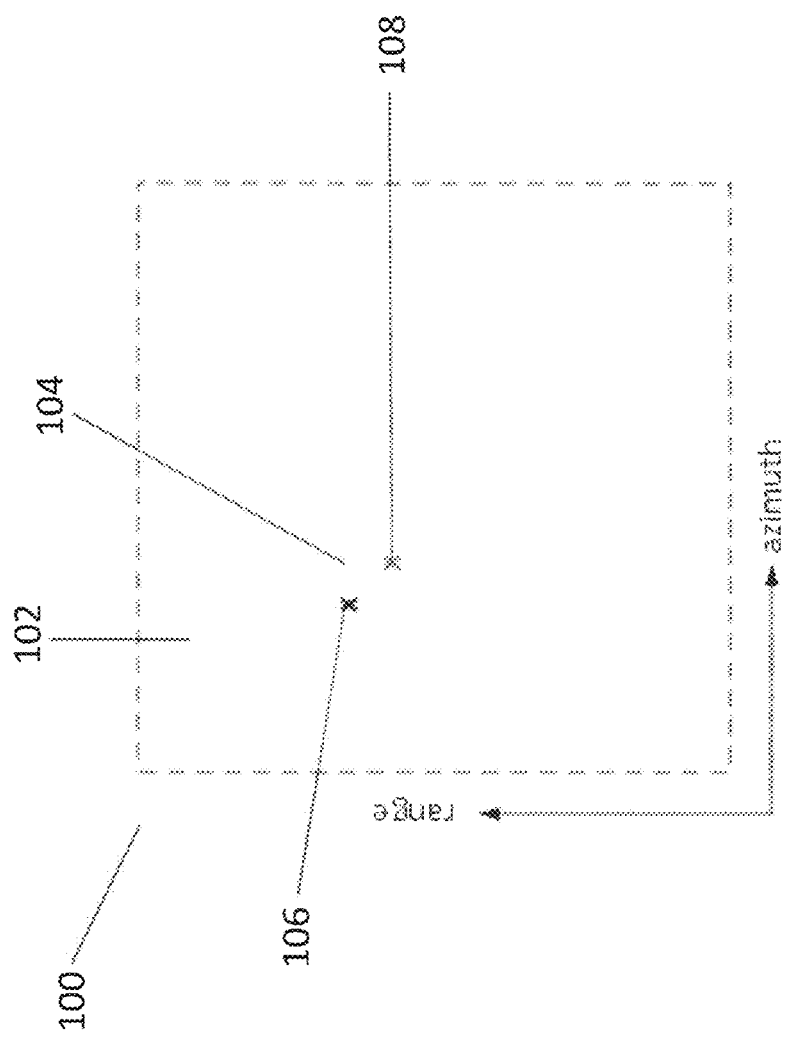
FIG. 1 shows an example of an image frame of a fully focused SAR image with a selected image sector comprising two target points.

FIG. 1 shows an example of an image frame of a fully focused SAR image (100) with a selected image sector (104) comprising two point targets (106, 108).

If the fully focused image (100) is focused on-board a satellite, an extraction of the relevant image sector (104) from a larger sector (102) may be accomplished with a high level of accuracy. These extractions may be accurate to a pixel level. In this embodiment, the extraction comprises two data points (106, 108). However, it will be apparent to the skilled person that any number of data points may be searched for and used in the extraction. The reduction of data volume may approximately correspond to the proportion of the selected image sector (104) to the fully focused SAR image (100).

The Nominal SAR Processor, however, cannot currently be implemented on-board a satellite due to size, weight and power restrictions.

Figure 2:
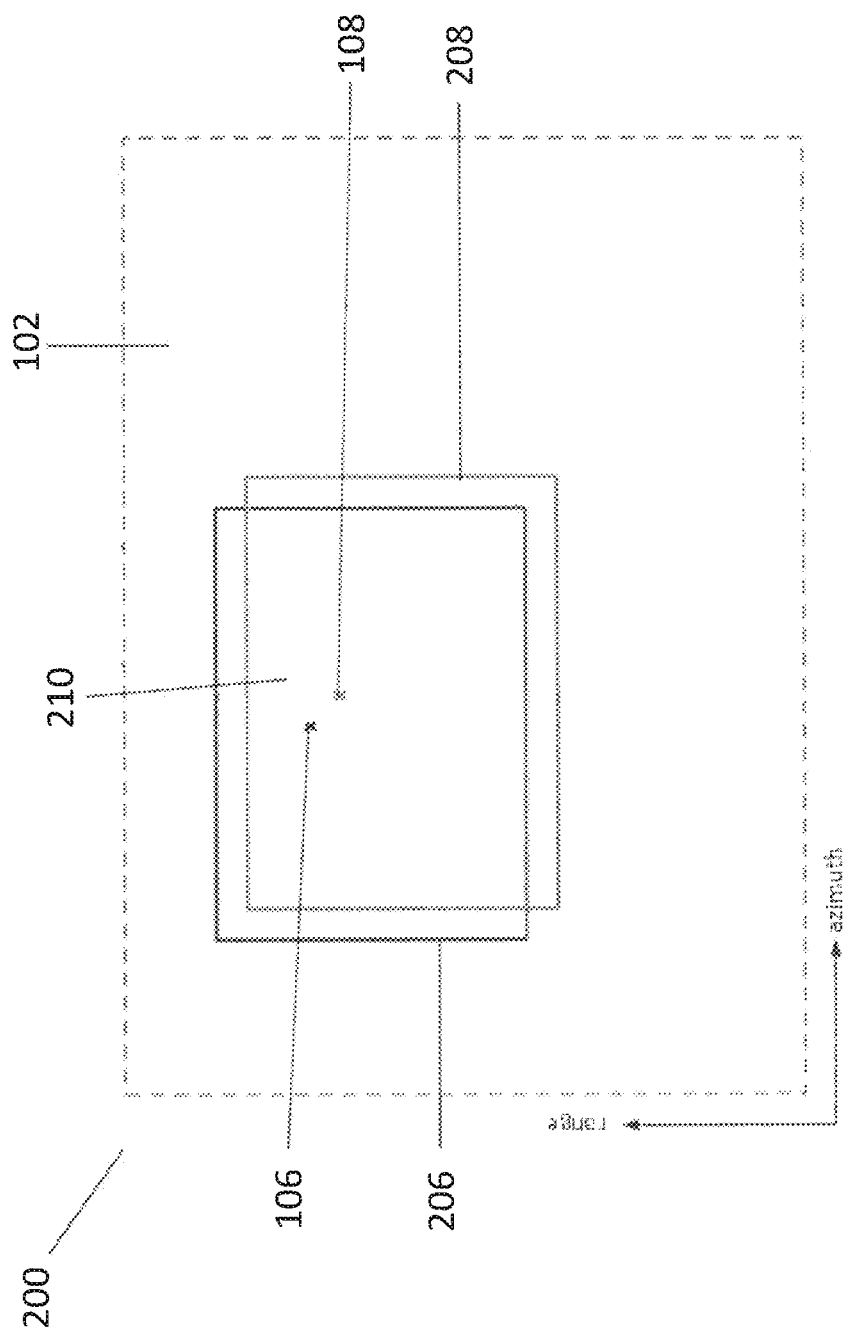
FIG. 2 shows a raw data matrix with a submatrix required to be extracted in order to capture all relevant information pertaining to the two point target echoes shown.

FIG. 2 shows a raw data matrix (102) of the larger sector with a submatrix (210) required to be extracted in order to capture all relevant information pertaining to the two point target echoes (106, 108) shown.

An extraction of data, without the disclosed preprocessor (900, 1000, 1100), would not allow for an efficient extraction of small image sectors from the raw data set as is seen in FIG. 2, which comprises a large submatrix area (210). As the two point targets (106, 108) are still defocused, the respective data fields (206, 208) containing the target information of the two point targets (106, 108) are still large, shown in this embodiment as two overlapping rectangles (206, 208), and the total data field (210) to be extracted in order to encompass the two point targets (106, 108) is large. The data reduction factor is therefore very low and so, the process is not particularly efficient.

Figure 3:
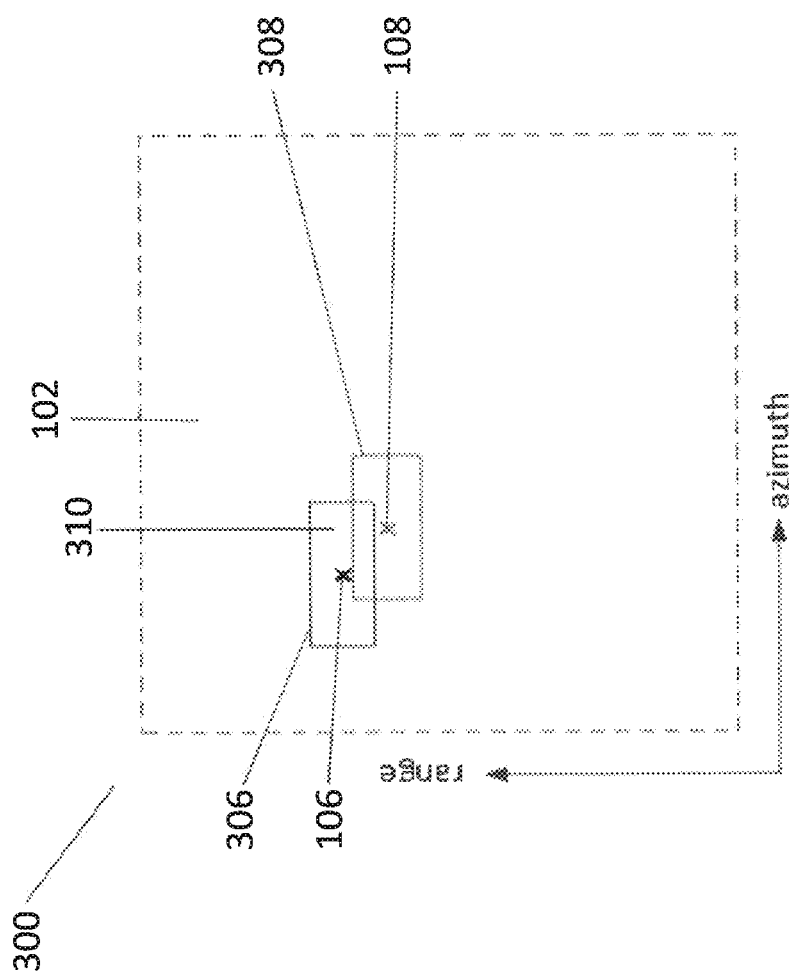
FIG. 3 shows a pre-focused image matrix with a submatrix required to be extracted in order to capture all the relevant information pertaining to the two point target echoes with the preprocessor described in the present invention.

FIG. 3 shows a pre-focused image matrix (102) with a submatrix (310) required to be extracted in order to capture all the relevant information pertaining to the two point target echoes (106, 108) with the preprocessor (900, 1000, 1100) described in the present invention.

An extraction of an image sector (310) which is only moderately larger than a fully focused image (see FIG. 1) can be performed by the present invention as is shown in FIG. 3. This can be easily seen visually as the submatrix area (310), the respective data fields (306, 308) related to a point target 106,108 and the overlap between the data fields (306, 308) are far smaller than the one shown in FIG. 2. This therefore allows the relevant target information (310) to be extracted from the raw data matrix (102) with far more efficiency as the volume of redundant data processed by the preprocessor (900, 1000, 1100) is far less. The data reduction factor in this case is high as the pixel overlap is approximately ±100 pixels. This is a small overlap when compared to typical sizes of SAR images leading to a more efficient process as the area to be processed is far smaller.

Figure 4:
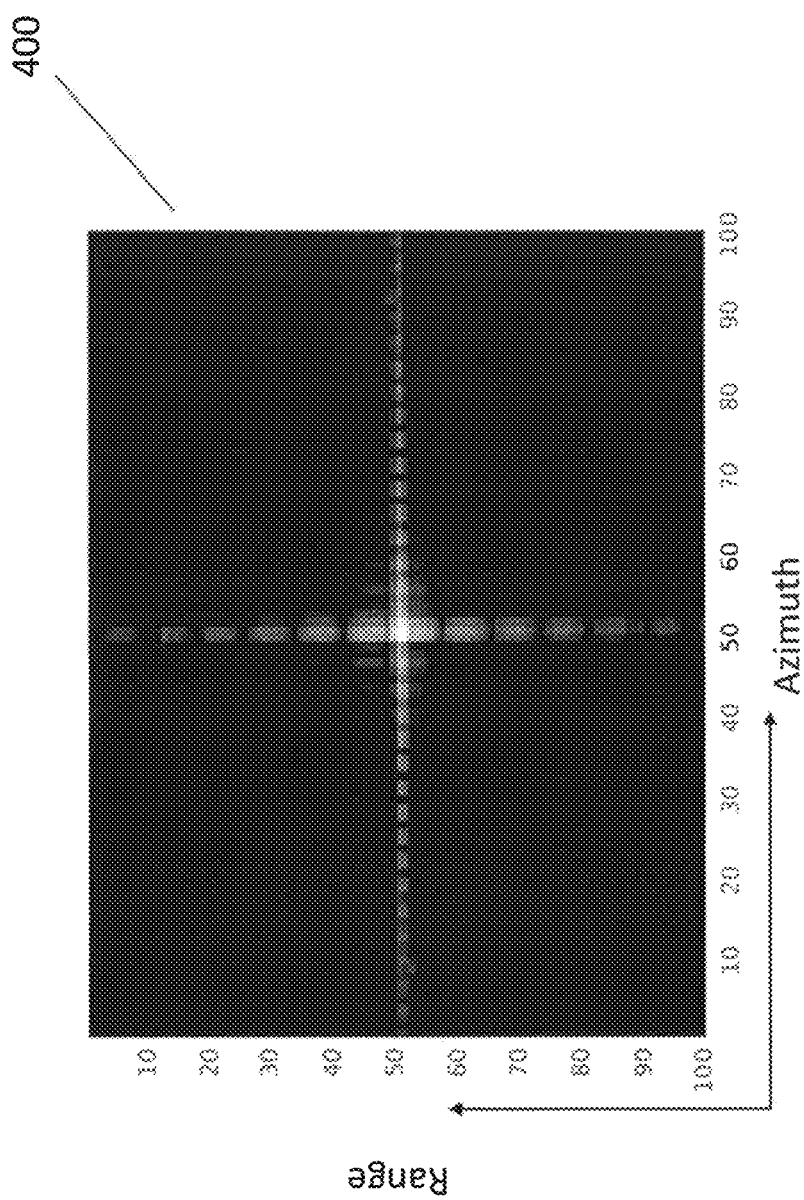
FIG. 4 shows an image of a fully focused point target echo without the preprocessor described in the present invention.

FIG. 4 shows an image of a fully focused point target echo (400) without the preprocessor (900, 1000, 1100) described in the present invention.

Figure 5:
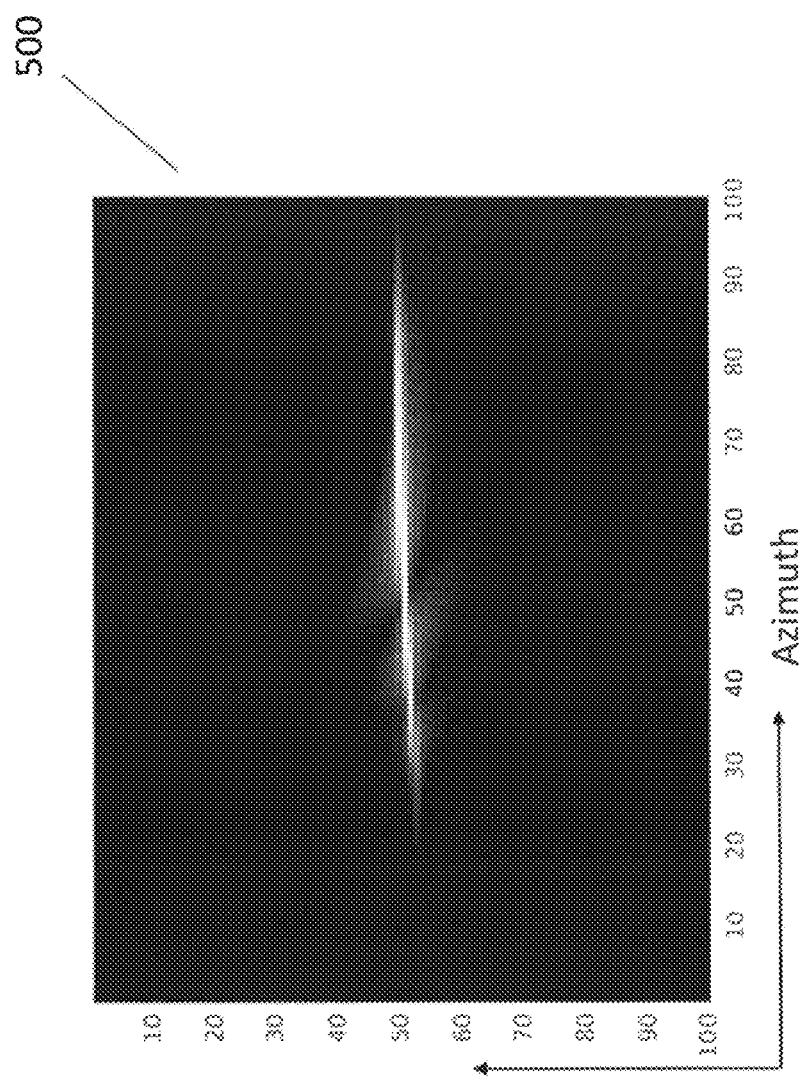
FIG. 5 shows an image of a pre-focused point target echo with the preprocessor described in the present invention.

FIG. 5 shows an image of a pre-focused point target echo (500) with the preprocessor (900, 1000, 1100) described in the present invention. The data represented in complete FIG. 5 corresponds to one of the data fields (306, 308) of FIG. 3.

Referring to FIGS. 4 and 5, a fully focused point target echo is shown as obtained from the on-ground Nominal SAR processor output (400) and a pre-focused point target echo from the on-board preprocessor output (500) according to the present invention. The results from the preprocessor output (500) are allowed to be far less accurate than the results from the Nominal SAR processor (400) as the reduced resolution of the preprocessor output will suffice to extract the desired image subsectors from the full SAR image. This may significantly reduce computing power and hardware resources on board.

Figure 6:
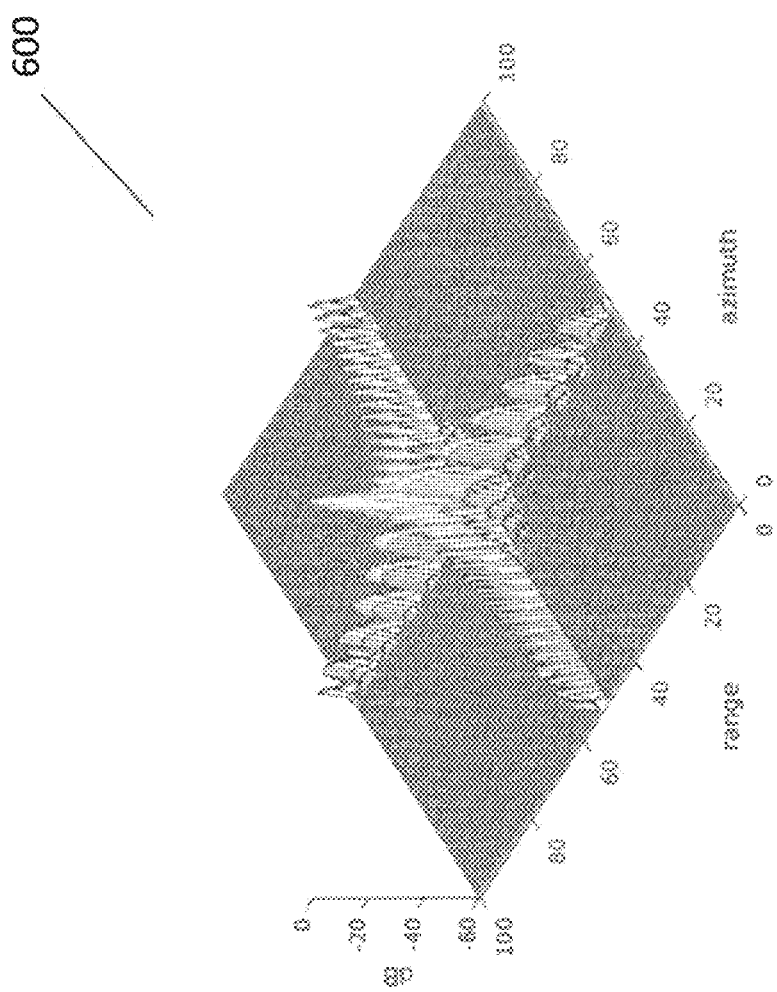
FIG. 6 shows a 3D plot of the echo in FIG. 4 with the z-axis being 60 dB.

FIG. 6 shows a 3D plot of the echo (600) in FIG. 4 with the z-axis being 60 dB.

Figure 7:
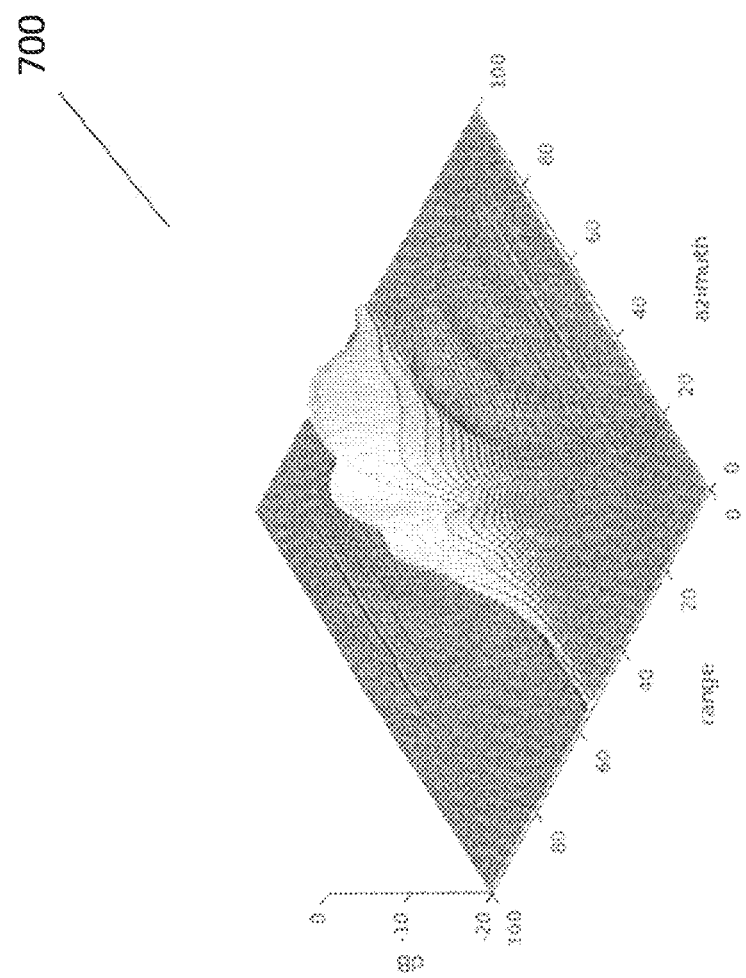
FIG. 7 shows a 3D plot of the echo in FIG. 5 with the z-axis being 20 dB.

FIG. 7 shows a 3D plot of the echo (700) in FIG. 5 with the z-axis being 20 dB.

Referring to FIGS. 6 and 7, the point target echoes (400, 500) as shown in FIGS. 4 and 5 can be seen more clearly in the form of two 3D plots (600, 700).

Figure 8:
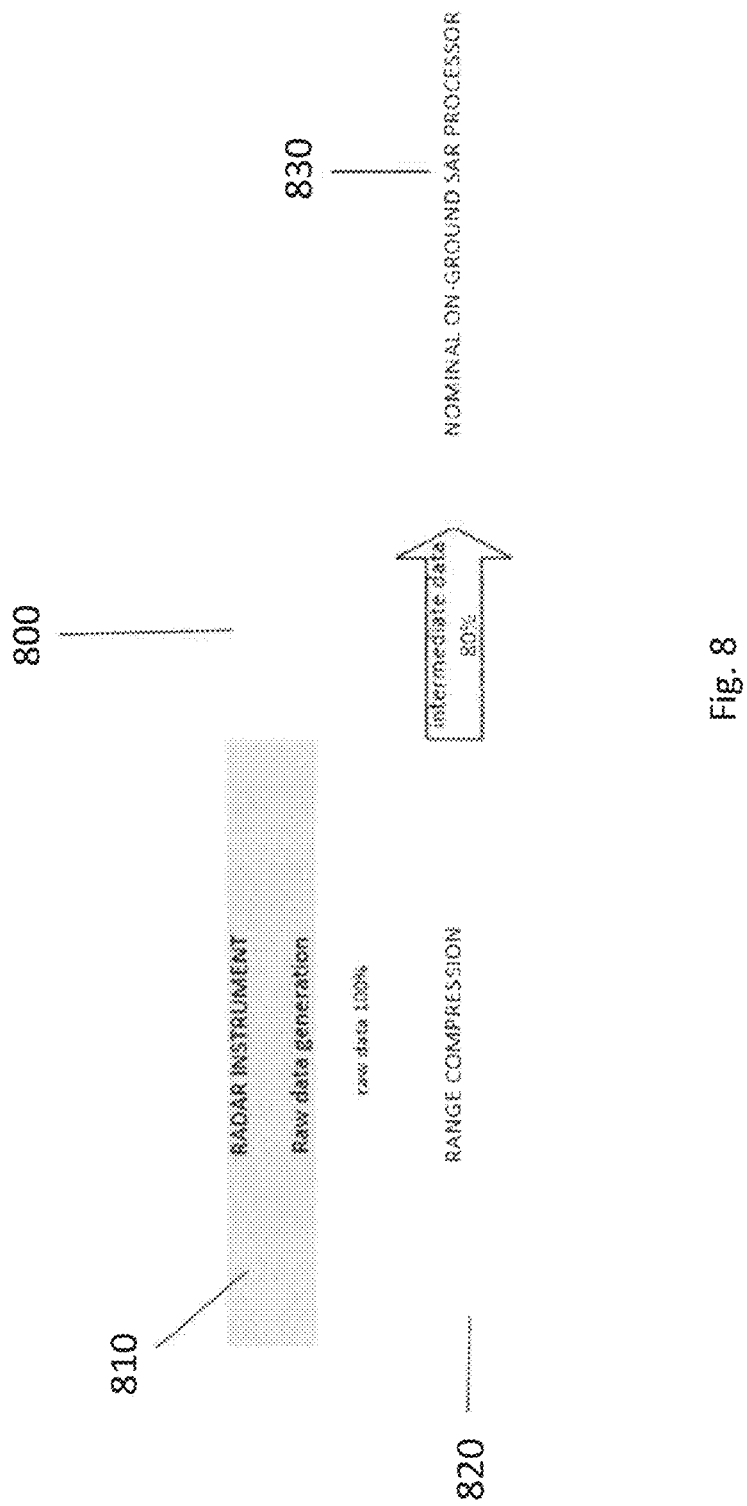
FIG. 8 shows a block diagram of a known processing scheme widely used in satellite earth observation (prior art)

FIG. 8 shows a block diagram (800) of a known processing scheme widely used in satellite earth observation. As the preprocessing according to the present invention will be used in such context it will be described as far as it is relevant for the present invention.

The SAR instrument (810) generate raw data as a long sequence of range lines. Range compression (820), such as that shown in FIG. 8, is the first functional stage of most SAR image processors.

After range compression (820), the transmit pulse can be stripped off the signal in each range line. If performed on-board a satellite, this procedure may reduce the number of range bins of the SAR raw data to be sent to the ground-based Nominal SAR processor by a moderate fraction such as, for example, 20%.

As will be described in the following FIGS. 9 to 11 in greater detail—the preprocessor (900, 1000, 1100) according to the present invention will use the range-compressed SAR raw data (with or without the transmit pulse having been stripped off the signal in each range line) as input data. The preprocessor's output data is suitable and intended to be fed into the ground-based Nominal SAR processor (830).

The Nominal SAR Processor (830) in the present context accepts range-compressed data as input and is otherwise arbitrary. It is ground-based and can be in the time domain, the frequency domain or any other type of domain. The Nominal SAR Processor (830) may also use any suitable type of processing in order to process the inputted data. The Nominal Processor (830) is however not part of this invention. The present invention may work with any selection of on-ground Nominal Processors (830).

The Nominal SAR Processor (830) may typically take into account one or more of the following effects:
Curved orbit
Scene topography
Higher order focusing error due to extended scene width
Intra-pulse distortion due to sensor motion
Atmospheric model
Antenna model and instrument transfer function These detailed effects do not need to be included in the preprocessor (900, 1000, 1100) as the raw data may later be reconstructed without loss in the selected image subsectors (104, 210, 310). Any number of these effects may later be taken into account by the Nominal Processor (830). For this reason, the preprocessor (900, 1000, 1100) is simpler than the Nominal Processor (830). The preprocessor (900, 1000, 1100) may not depend on a large number of external interfaces, and an on-board implementation of preprocessing may require less hard- and software resources than a commonly used Nominal Processor (830). This means that the present invention may be implemented as a bridge technology before nominal on-board processing becomes feasible in the future.

Figure 9:
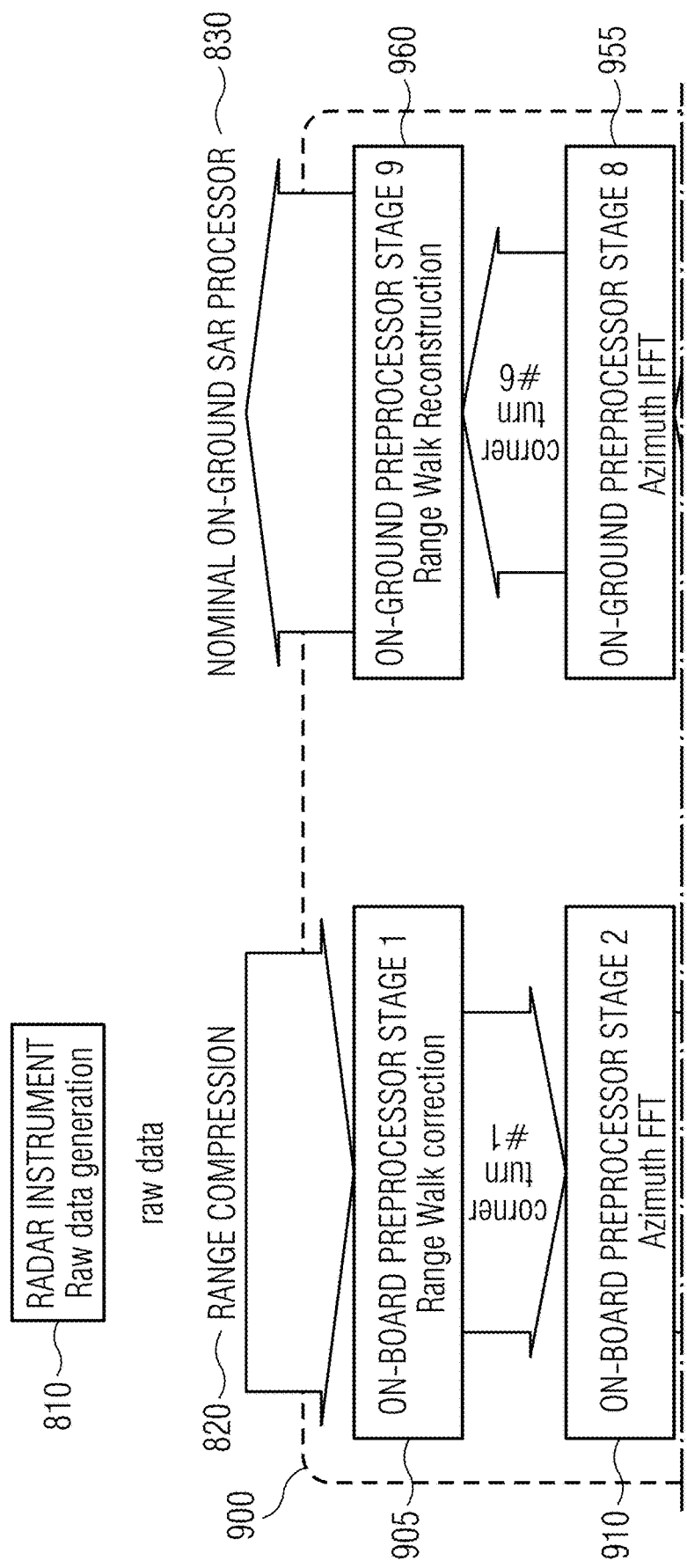
FIG. 9 shows a block diagram of the software of the preprocessor described in the present invention using a Range-Doppler focusing algorithm.
Figure 10:
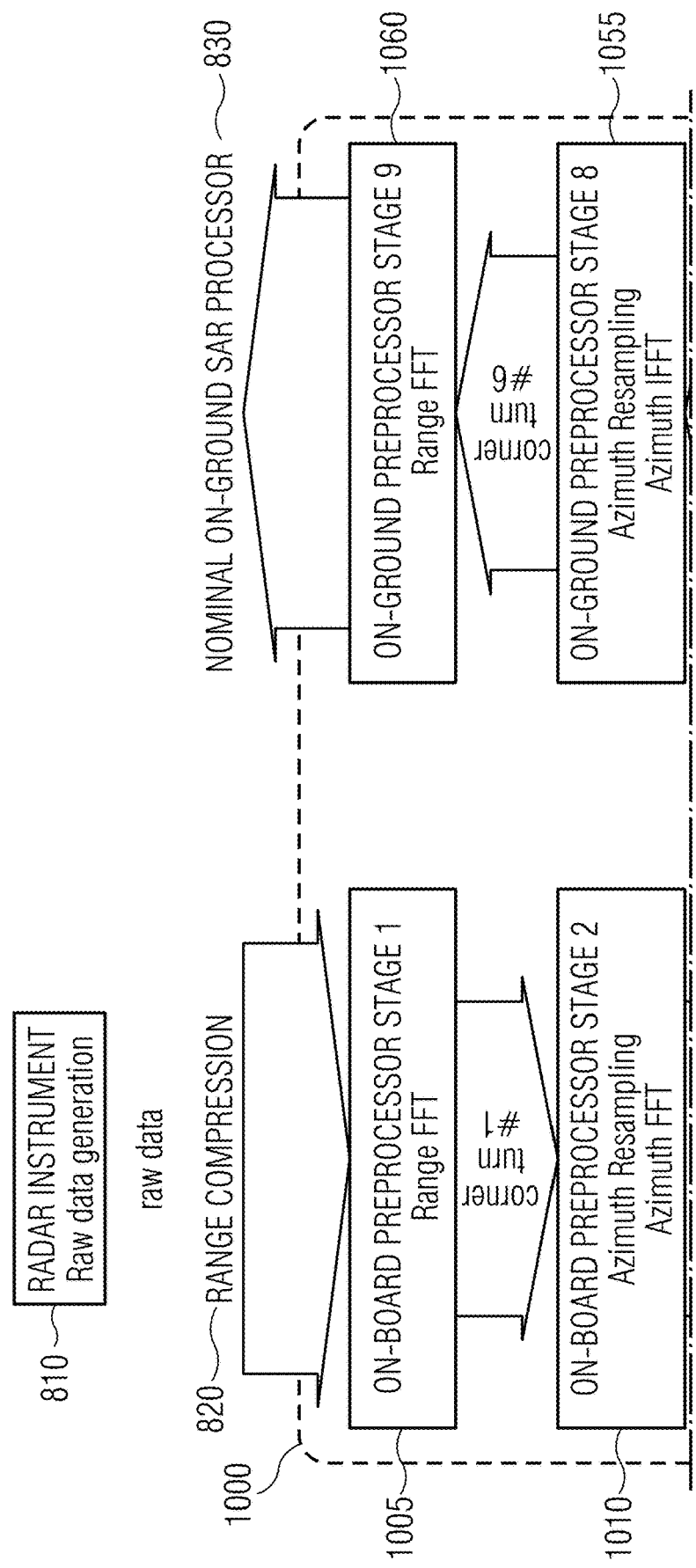
FIG. 10 shows a block diagram of the software of the preprocessor described in the present invention using an Omega-K focusing algorithm.

FIG. 9 shows a block diagram (900) of the preprocessor, e.g., of the software of the preprocessor, described in the present invention using a Range-Doppler focusing algorithm FIG. 10 shows a block diagram (1000) of the preprocessor, e.g., of the software of the preprocessor, described in the present invention using an Omega-K focusing algorithm The selection of the preprocessor stage algorithms is not prescribed by this invention. However, two preferred embodiments are presented, the first based on the Range-Doppler SAR focusing algorithm (FIG. 9) and the other on the Omega-K SAR focusing algorithm (FIG. 10). As will be obvious to the skilled person, other focusing algorithms can be implemented in conjunction with the invention, depending on the focusing requirements of the SAR mode and the Nominal Processor (830).

Block diagrams of two embodiments of the preprocessor (900, 1000) are shown in FIGS. 9 and 10. The preprocessor (900, 1000) intercepts the data flow between the Range Compression module (820) and the nominal on-ground SAR processor (830) shown in FIG. 8. The preprocessor (900, 1000, 1100) may cause a significant data reduction at the space-to-ground downlink interface. The preprocessor (900, 1000) comprises, an on-board portion (the left side of the block diagrams (900, 1000)) which performs a SAR preprocessing for a pre-focusing of the SAR image and an on-ground part (right side of the block diagrams (900, 1000)) which performs an inverse SAR preprocessing for the reconstruction of the original radar data that was used as input data for the preprocessing. The data rate from on-board portion of the preprocessor to on-ground part may be significantly reduced depending on the size of the selected image subsector (310) that is due to be transmitted. The output generated by the on-ground portion may be a reconstructed raw data set which may be equal in format to and equal or smaller in size than the original set. This output can be processed by the Nominal processor (830) as though directly obtained from the SAR instruments (810) on-board the satellite. After such preprocessing, the obtained SAR image may contain the selected image subsectors (310) while the remainder of the image may be void. This preprocessing may lead to the subsectors (310) being nearly perfectly focused.

Loss may only occur if the defocusing exceeds the size of the data fields (306, 308) comprising the target information (106, 108). Theoretically, some signal energy will always leak the data field (306, 308), but depending on the preprocessor focusing algorithm and the size of the data field (306, 308), the percentage of leaking can be made arbitrarily small and so, the preprocessing process may be quasi-lossless with respect to the selected image subsectors.

Different preprocessor pre-focusing algorithms may be possible within the implementation of this invention. While many Nominal processors (830) today are time domain processors, the selected preprocessor (900, 1000, 1100) should preferably rely on the frequency domain for an efficient bulk focusing. A fundamental principle of the present invention is the reversibility of the complex-valued algorithms of SAR processing which may take into account the phase of the signal. The defocusing incurred with the preprocessor (900, 1000) may not deteriorate the final result as the on-board sequence of stages 1-5 may be reversed in the on-ground stages 6-9. This reversal may be done without loss.

The preprocessor modules (900, 1000), e.g., software modules (900, 1000), should preferably be executed in 4 or 5 stages to perform the pre-focusing of the SAR-image. In each of the first four stages, the two-dimensional signal matrix may be processed in a dedicated direction. Each stage may end with a Fast Fourier Transform FFT and/or a corner turn.

The Range-Doppler focusing algorithm will be known by the skilled person however, a short overview of the algorithm as used in the embodiment of FIG. 9 is provided.

The range compression module (820) receives raw data to compress from the SAR instruments (810) just the same as in known processing systems.

The preprocessor (900) receives the data after the range compression stage (820) and in stage 1 (905), performs a range walk correction on the data in order to the curvature of the range-compressed data.

In stage 2 (910), the data is put through an azimuth FFT to modify the data so that it is now in the Range-Doppler domain. This modulation allows for the data to be bulk focused.

Range Cell Migration Correction is performed on the data in stage 3 (915) in order to correct for the changing range delay to a point target as the target passes through the antenna beam.

The data is then put through an azimuth compression and an azimuth IFFT in stage 4 (920) so that the data is in a suitable format for downlinking to the on-ground part of the preprocessor and, if needed, in a format for the outputs to be coherently summed in stage 5 (925). Stage 4 (920) additionally extracts the image subsectors from the modified data.

The preprocessor (900) can be tailored to a subset of range lines of the full data take and/or to a sub-band of radar frequencies. Such tailoring may require an iteration of stages 1-4 at reduced processing requirements at a number of loops. In stage 5 (925), the data collected after each loop may be added coherently.

The data from stage 4 (920) or stage 5 (925) is then output to a solid state memory (930) and downlinked (935) e.g., by a radio link or by laser communication, to the on-ground portion of the preprocessor where the data is received by a ground station storage media (940). This data may be transmitted in any format that is suitable for the solid state memory and the ground station storage media.

This downlinked data is then inputted into stages 6-9 where the processing stages of stages 1-4 are reversed.

Stage 6 (945) comprises zero padding which is the inverse of the subsector extraction in stage 4 (920) of the preprocessor. This data is then put through an azimuth FFT and an azimuth expansion so that efficient bulk defocusing is achieved.

This data is then input into stage 7 (950) where Range Cell Migration Reconstruction is performed so that the data is reconstructed for the Nominal processor (830) to process.

Stage 8 (955) comprises an azimuth IFFT so that the data is in a suitable form for the Nominal processor (830) to process.

Stage 9 (960) comprises Range Walk Reconstruction to apply the original echo curvature.

This data is then outputted to the Nominal processor (830) for the data to be further processed similar to the presently known processing schemes.

After each of stages 1-3 and 6-8, a corner turn is performed on the outputted data.

The Omega-K focusing algorithm will be known by the skilled person however, a short overview of the algorithm as used in the embodiment of FIG. 10 is provided.

The range compression module (820) receives raw data to compress from the SAR instruments (810) just the same as in known processing systems.

The preprocessor (1000) receives the data after the range compression stage (820) and in stage 1 (1005), performs a range FFT so that it is in a suitable format for the Omega-K focusing algorithm.

In stage 2 (1010), the data is put through an azimuth resampling and an azimuth FFT to modify the data so that it is now in the frequency domain. This modulation allows for the data to be more efficiently bulk focused.

A Stolt interpolation for circular orbit and a range IFFT are performed on the data in stage 3 (1015) in order to correct for the circular orbit of a satellite and point target range walk, in relation to a point target as the target passes through the antenna beam of the satellite.

The data is then put through an azimuth compression and an azimuth IFFT in stage 4 (1020) so that the data is in a suitable format for downlinking to the on-ground part of the preprocessor and, if needed, in a format for the outputs to be coherently summed in stage 5 (1025). Stage 4 (1020) additionally extracts the image subsectors from the modified data.

The preprocessor (1000) can be tailored to a subset of range lines of the full data take and/or to a sub-band of radar frequencies. Such tailoring may require an iteration of stages 1-4 at reduced processing requirements at a number of loops. In stage 5 (1025), the data collected after each loop may be added coherently.

The data from stage 4 (1020) or stage 5 (1025) is then output to a solid state memory (1030) and downlinked (1035) to the on-ground portion of the preprocessor where the data is received by a ground station storage media (1040). This data may be transmitted in any format that is suitable for the solid state memory and the ground station storage media.

This downlinked data is then inputted into stages 6-9 where the processing stages of stages 1-4 are reversed.

Stage 6 (1045) comprises zero padding which is the inverse of the subsector extraction in stage 4 (1020) of the preprocessor. This data is then put through an azimuth FFT and an azimuth decompression so that efficient bulk defocusing is achieved.

This data is then input into stage 7 (1050) where a second range FFT and an inverse Stolt interpolation is performed in order to reverse the accounting for range walk and circular orbit that occurred in stage 3 (1015). This leads to the extracted subsector data being reconstructed for the Nominal processor (830) to process.

Stage 8 (1055) comprises an azimuth IFFT and an azimuth resampling so that the data is in a suitable form for the Nominal processor (830) to process.

Stage 9 (1060) comprises a range IFFT so that the data is in a suitable format for the Nominal processor (830) to process.

This data is then outputted to the Nominal processor (830) for the data to be further processed similar to the presently known processing schemes in a Nominal SAR processor.

The output obtained at stage 4 (920, 1020) of the embodiments (900, 1000) are pre-focused images. From this output, only the relevant subsectors are retained. This may cause a significant reduction of the radar data.

Stage 5 (925, 1025) is optional at the expense of less data reduction. If the preprocessor (900, 1000) does not use coherent summing of the output pertaining to potential subsectors, the output data of each loop may be transmitted to ground individually.

Any or all of the processing of stages 1-5 in either embodiment (900, 1000) may be reversible, the subsector extraction in stage 4 (920, 1020) may or may not be reversible. Subsector extraction may be reversed in stage 6 (945, 1045) by zero padding. This procedure does not intend to reconstruct data lying outside the selected subsectors. All the other stages may be reversed in an order opposite to that of stages 1-5.

The output of stage 9 (960, 1060) may be raw data containing only the data of the selected image subsectors (310). This output may be fed to the Nominal on-ground SAR processor (830) for full-performance focusing.

Figure 11:
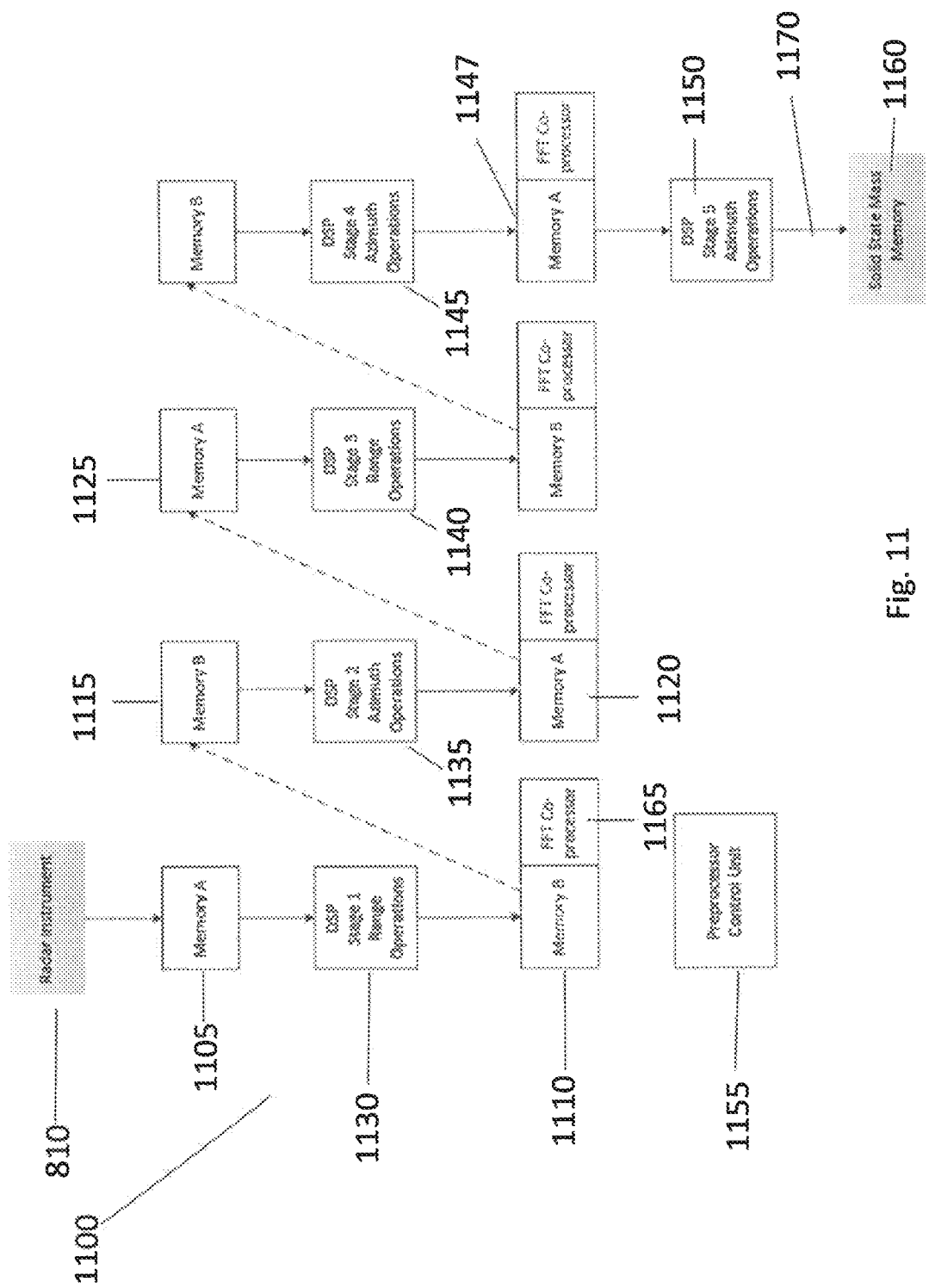
FIG. 11 shows a block diagram of the hardware of the preprocessor described in the present invention.

FIG. 11 shows a block diagram (1100) of the hardware of the preprocessor described in the present invention.

While the functionality of the preprocessor (1100) is reduced compared to any Nominal processor, on-board processing power requirements are still demanding for state-of-the-art flightworthy hardware. A potential on-board hardware architecture (1100), which is dedicated to the on-board part of the preprocessor (stages 1-5), is shown in FIG. 11.

Stages 1-4 may be processed using a stage architecture comprising the following processing elements:

An input memory (1105) to the stage

A digital signal processor DSP (1130) with software programmability

An output memory (1110) from the stage

An FFT coprocessor (1165) which reads from the output memory (1110), performs an FFT or IFFT, and stores the output data in corner-turned order. The meaning of corner-turn of 2-d data sets will be known to the person skilled in the art: When a 2-d data set is read from or written to memory in linear sequence and with priority in one dimension, a corner-turn switches from this priority and from this dimension to the other.

Two physically distinct memory units Memory A and Memory B are preferably utilized as input and output memories for a given digital signal processor DSP, respectively. The provision of two memories rather than one increases avoids input/output interlacing of the DSP and thereby increases processing speed of the preprocessor.

Each stage may have one or more of these processing elements.

A stage architecture may be implemented once, and the stages 1-5 processed sequentially. Alternatively, multiple stages can be implemented in parallel, for pipeline processing.

Each stage may operate along a dedicated signal direction, either in range or in azimuth direction. For efficiency, the stages may be processed in a line-by-line sequence, performing standard DSP-supported signal processing functions such as vector pointwise multiplication, filtering, interpolation, resampling.

Each stage may terminate with an FFT or an IFFT in the dedicated direction, performed by the fast FFT-Coprocessor (1165). The coprocessor (1165) may write the data to the output memory effecting a corner turn.

If the preprocessor operates in iterative manner, Stage 5 (1150) may perform a coherent summation of the outputs of the preceding iterative loops.

A standard complex-instruction-set computer (CISC) (1155) may be used as a control unit for the overall on-board preprocessor architecture (1100). The CISC (1155) may control and synchronize the elements of the stage architecture. It may also provide auxiliary data for stages 1-5 obtained from complex-valued non-linear computations. It may also instruct one or more of the stages of the architecture (1100) to perform an image subsector extraction on the data received by the respective stage.

A potential alternative to using DSPs in the Stage Architecture may be using one or more field-programmable gate arrays FPGA.

Regarding the issue of flightworthiness for satellite implementation, only dedicated elements of the preprocessor hardware may be needed to be fully radiation-hardened. Single-event upsets (SEU), for example, must not contaminate program execution but at low rates are insignificant in relation to the full set of data vectors which may be handled by this architecture.

The input (1105) of stage 1 (1130) is the output of the SAR instruments (810) subjected to standard range-compression. The output (1147) of stage 4 (1145) or the output of stage 5 (1150) may be output to the solid state mass memory (1160) of the architecture depending on whether the preprocessor uses an iterative process. This mass memory (1160) may then downlink the outputted data in a suitable format to an on-ground preprocessing architecture.

As can be seen from FIG. 11, the data output from each stage is then used as the input for the next stage. For example, the output (1110) of stage 1 (1130) is then used as the input (1115) for stage 2 (1135). Likewise, the output (1120) of stage 2 (1135) is used as the input (1125) for stage 3 (1140), etc.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for preprocessing synthetic aperture radar images, wherein the method comprises:
receiving range-compressed radar data generated from raw radar image data on-board a satellite or an airborne vehicle;
generating a preliminary synthetic aperture radar, SAR, image by
performing a pre-focusing on the range-compressed radar data;
extracting image subsectors from the preliminary SAR image;
transmitting the extracted image subsectors to an on-ground portion;
reconstructing the range-compressed radar data pertaining to the extracted image subsectors; and
making the range-compressed radar data pertaining to the extracted image subsectors available for a Nominal synthetic aperture radar processor,
wherein the Nominal synthetic aperture radar processor is configured to generate a focused SAR image having a nominal value of image resolution that is higher than a resolution of the preliminary SAR image.

2. The method of claim 1, wherein, for performing the pre-focusing, one or more of the following steps is applied:
performing a first Fast Fourier Transform on the range-compressed radar data;
performing a first correction on the data outputted by the first Fast Fourier Transform; or
performing a first Inverse Fast Fourier Transform on the data received from the first correction.

3. The method of claim 2, wherein at least one of the first Fast Fourier Transform or the first Inverse Fast Fourier Transform is an azimuth Fourier Transform.

4. The method of claim 1, wherein, for reconstructing the range-compressed radar data pertaining to the extracted image subsectors, one or more of the following steps is applied:
performing image subsector zero-padding on the received data from the image subsector extraction;
performing a second Fast Fourier Transform on the data received from the image subsector zero-padding;
performing a second correction on the data outputted by the second Fast Fourier Transform; or
performing a second Inverse Fast Fourier Transform on the data received from the second correction.

5. The method of claim 4, wherein at least one of the second Fast Fourier Transform or the second Inverse Fast Fourier Transform is an azimuth Fourier Transform.

6. The method of claim 1, wherein, for performing the pre-focusing, a Range-Doppler SAR focusing algorithm or an Omega-K focusing algorithm is applied, wherein the focusing algorithm is adapted to a circular orbit geometry.

7. An apparatus for preprocessing synthetic aperture radar images, wherein the apparatus comprises:
a first performing component configured to receive range-compressed radar data and to perform a pre-focusing on the range-compressed radar data, resulting in a preliminary synthetic aperture radar, SAR, image at a reduced resolution compared to a nominal value;
an image extraction component configured to extract image subsectors from the preliminary SAR image outputted by the first performing component;
an output configured to transmit the extracted image subsectors; and
a second performing component configured to receive the image subsectors transmitted by the output and to reconstruct the range-compressed radar data pertaining to the extracted image subsectors,
wherein the second performing component is configured to feed the reconstructed range-compressed radar data as output data to a Nominal synthetic aperture radar processor.

8. The apparatus of claim 7, wherein the first performing component features a stage architecture of multiple stages, wherein one or more of the stages use at least one of:
an input memory for receiving either range-compressed radar data in a first processing stage or output data of a previous stage;
a signal processor with software programmability configured to read data from the input memory;
an output memory configured to receive data from the signal processor;
a Fast Fourier Transform coprocessor configured to read data in the output memory, configured to perform a Fast Fourier Transform or an Inverse Fast Fourier Transform on such data, and configured to store such transformed data after the Fast Fourier Transform or an Inverse Fast Fourier Transform has been performed; or
a complex-instruction-set computer configured to control the apparatus elements.

9. The apparatus of claim 8, wherein the Fast Fourier Transform coprocessor is configured to write the transformed data after the Fast Fourier Transform or an Inverse Fast Fourier Transform has been performed to the output memory effecting a corner turn.

10. The apparatus of claim 7, wherein the first performing component is configured to process radar images in an azimuth direction or a range direction.

11. The apparatus of claim 7, wherein the first performing component is configured to apply a Range-Doppler focusing algorithm or an Omega-K focusing algorithm, wherein the applied focusing algorithm is adapted to a circular orbit geometry.

12. The apparatus of claim 8, wherein the signal processor comprises a digital signal processor or a field-programmable gate array.

13. The apparatus of claim 7, wherein the apparatus features a modular design, wherein the first performing component is configured to be integrated in a satellite or an airborne vehicle, and wherein the second performing component is configured to be operated on ground.

* * * * *